V. RASCHELLA.
WAVE MOTOR.
APPLICATION FILED OCT. 12, 1909.
1,009,096.
Patented Nov. 21, 1911.
2 SHEETS—SHEET 1.
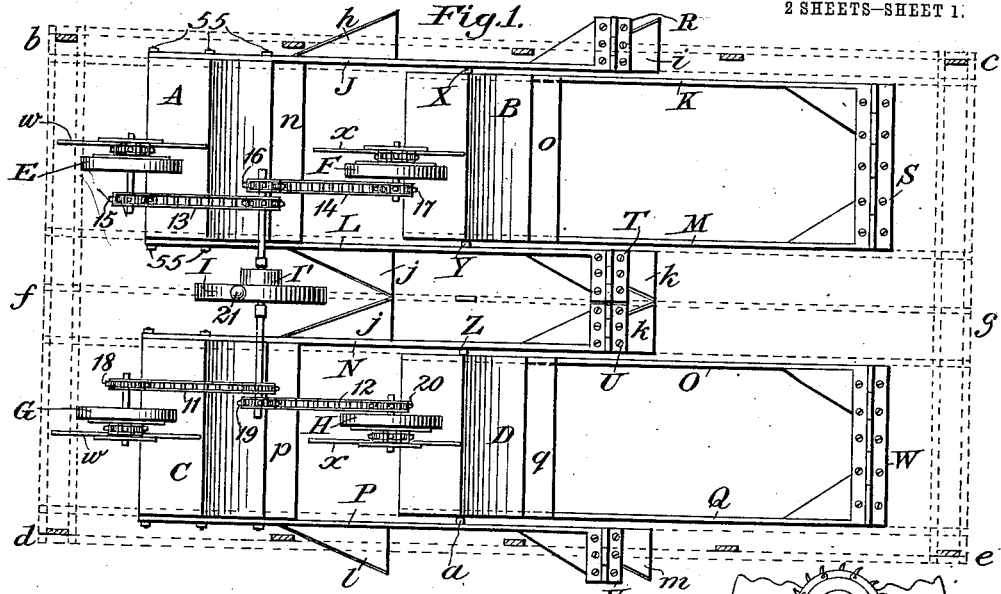
Fig. 1.
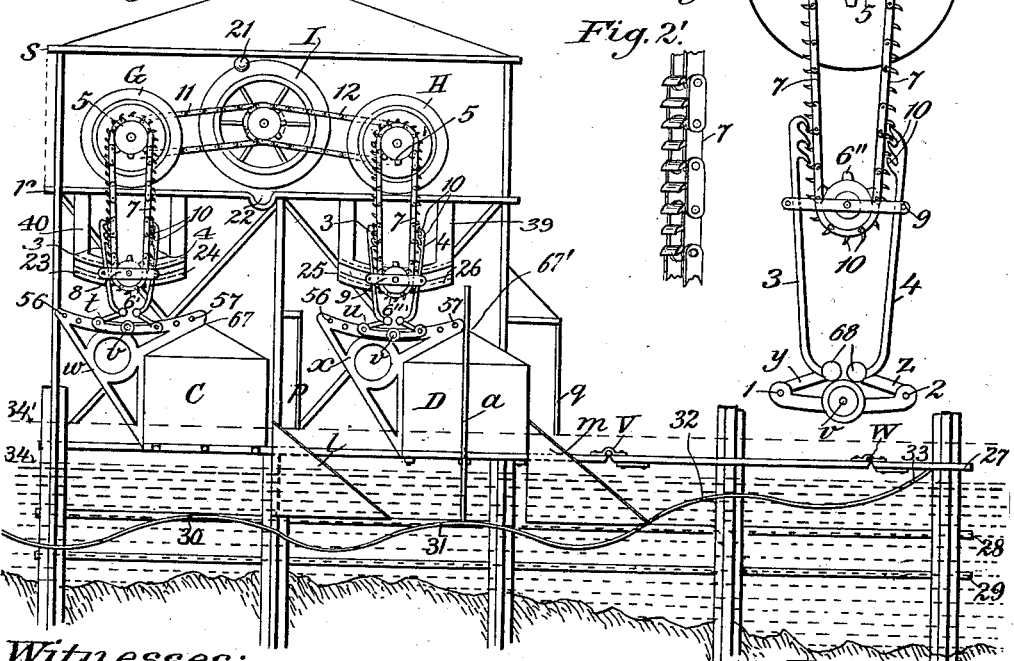
Fig. 2. Fig. 2'. Fig. 2".
Witnesses:
Inventor:
Vincent Raschella V. RASCHELLA.
WAVE MOTOR.
APPLICATION FILED OCT. 12, 1909.
1,009,096.
Patented Nov. 21, 1911.
2 SHEETS—SHEET 2.
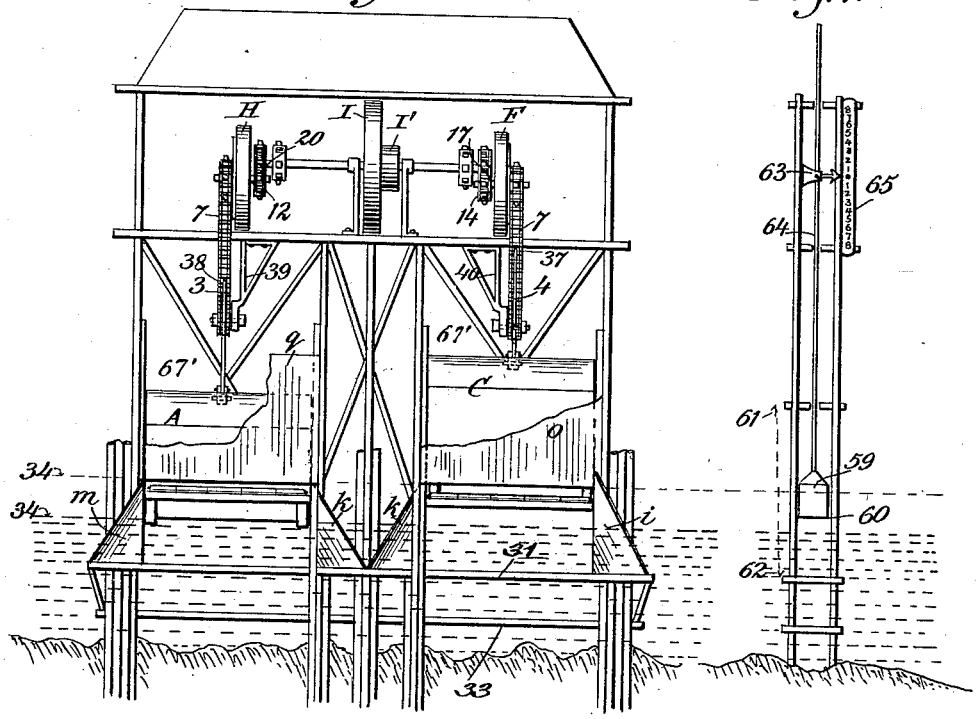
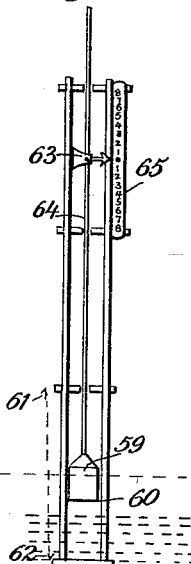
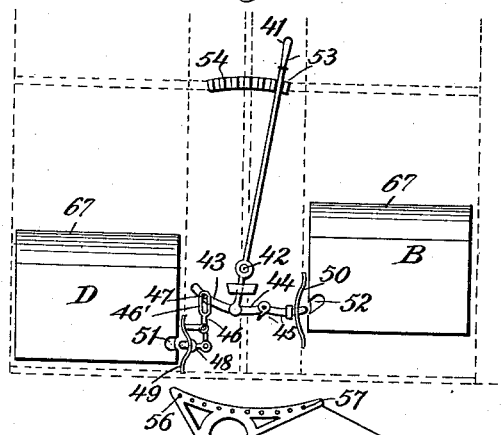
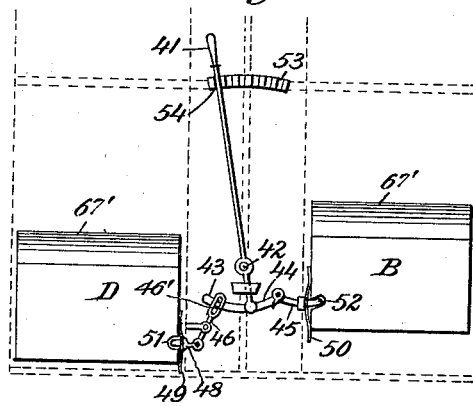
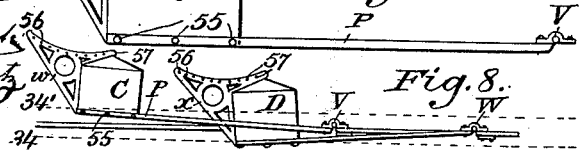

UNITED STATES PATENT OFFICE.

VINCENT RASCHELLA, OF UNION, NEW JERSEY.

WAVE-MOTOR.

1,009,096.  Specification of Letters Patent.  Patented Nov. 21, 1911.

Application filed October 12, 1909. Serial No. 522,322.

*To all whom it may concern:*

Be it known that I, VINCENT RASCHELLA, a citizen of the United States, residing at New York, in the county and State of New York, have invented certain new and useful Improvements in Wave-Motors, of which the following is a specification, reference being had therein to the accompanying drawings.

My invention relates especially to means and mechanism for utilizing the rise and fall of sea waves, and has for its object the provision of a very effective wave motor.

To attain the desired end, my invention consists in certain novel and useful combinations or arrangements of parts, and peculiarities of construction and operation, all of which will be hereinafter first fully described, and then pointed out in the claims.

In the drawing, Figure 1 is a plan view of a wave motor embodying my invention. Fig. 2 is a side elevation thereof. Figs. 2' and 2" are detail views. Fig. 3 is an end elevation. Figs. 4 and 5 are side elevations of the brake employed for regulating the speed of or stopping all movement of the motor. Fig. 6 is a detail view of one of the floats. Fig. 7 is a side elevation of the register for ascertaining the height of the waves. Fig. 8 is a side elevation of two floats.

Similar letters and numerals of reference, wherever they occur, indicate corresponding parts in all the figures.

In the drawings, A, B, C and D are four floats.

E, F, G and H are four fly wheels, one for each float.

I is a central fly wheel, mounted upon a shaft, and to which the shafts of the first mentioned fly wheels are connected by sprocket chains.

I have shown but four floats and their connections to the shaft of the main fly wheel, but it is obvious any number of floats, each adapted to transmit motion to the main shaft may be used without departing from the spirit of my invention. Each float is connected to two levers, designated respectively by the letters J, K, L, M, N, O, P and Q, each pair of levers being pivoted to beams, R, S, T, U, V and W, whereby the floats are adapted to rise and fall alternately. Guides X, Y, Z and $a$ are employed to maintain the floats B and D in a proper position.

The dotted lines $b$, $c$, $d$ and $e$, forming a parallelogram indicate a frame of beams at the water level upon which the motor is supported. When the motor is completed, $f$ designates the rear, toward the shore: $g$ the front toward the sea. Consequently the waves moving toward $g$ will pass beneath the floats.

The spaces designated by the letters $h$, $i$, $j$, $k$, $l$ and $m$, are formed by converging lateral boards, or the equivalent, to direct the moving wave toward the floats, and concentrate the power of the wave. The parts marked $n$, $o$, $p$ and $q$ are protecting boards to prevent the waves striking the floats in front. The floor above $r$, $s$, is housed in to shelter the machinery and operatives.

The two floats, C, D, as illustrated in the drawing, are resting in a horizontal position, the center of their movement. When in motion, the alternate movement up and down of each float, is communicated to the mechanism $t$, $u$, for converting the vertical movement into continuous rotary motion.

Referring to Fig. 2, $v$ is pivoted to a perforated plate $w$, $x$. At 1 and 2, (Fig. 2") are pivoted the lower supports $y$, $z$ of the vertical bars 3 and 4, bearing at their upper extremities a plurality of teeth 10, projecting in opposite directions. These bars are kept in a downward position by the weights 68, without the use of springs, being pressed toward each other, thus keeping in contact with the links of the chain 7. The chain wheels 5, 6' and 6" are arranged to be moved by the chains 7. The wheel 5 is upon the axle of the fly wheel, while 6' and 6" are auxiliary, and are employed to keep the chains attached. The side bars 8 and 9 on the axle of wheels 6' and 6" are to guide the bars 3 and 4.

When a float rises, the teeth 10 which point upward, are caught in the chain links, moving the chain, but the opposite teeth which point downward pass over the links without engaging them. When the float descends, this action is reversed, thus establishing a continuous rotary movement to the fly wheel shaft, from whence it is conveyed to the main or transmitting shaft. Each float gives motion to a fly wheel independently by means of the chains 11, 12, 13 and 14, concentrating the same on the shaft of the central fly wheel I, and by means of a pulley I' the whole power may be applied to any machinery it is desired to drive. The chain wheels 15, 16, 17, 18, 19 and 20 should be of equal size. A weight 21 is placed on the fly wheel I, and said weight, when the fly wheel has made half a revolution, will fall of 22, where it remains until required for another start.

As in accordance to the atmospheric disturbances the height of waves vary, I attach to each of the floats A and C the plate $w$, and to each of the floats B and D the plate $x$, provided with perforations 56 and 57 in which the connection $v$ is arranged to engage, thereby accommodating the mechanism to the length of movement of the float. For example, each float with a medium height of wave would travel the distance from 34 to 34', but in case of excessive height of wave, the connection $v$ is carried toward 57, shortening the vertical movement of the connection $v$, to avoid damage to the machinery. When the waves diminish in height the connection $v$ should be moved toward 56. For such change, the chain wheels 6' and 6" are moved toward 23 and 25, or 24 and 26, according to requirements.

The structure 27, 28 and 29 is a frame of horizontal beams: These are sustained by a number of vertical piles. The curved lines 30, 31, 32, 33, represent a wave bed of thick boards. The distance from one curve to another is approximately equal to the distance maintained between the sea waves, so that the boards 30, 31, 32, 33 are so located that every crest of a wave will locate itself in the best position with relation to the floats.

39 and 40 are supports for the guides 24 and 26 on which the lower chain wheels 6' and 6" are guided to the right or left to suit the location of the connection $v$ with respect to either of the perforations 56 or 57.

In the brake mechanism 41 is a lever fulcrumed at 42, and having arms 43 and 44. To the arm 44 is attached a pin 45, while the arm 43 connects with a small lever 46, through the pin 47 sliding in the slotted portion 46' of lever 46. To the lever 46 is attached a pin 48. The pin 45 passes through the spring 50 and into the hole 52 of the float B, and the pin 48 passes through the spring 49 and into the hole 51 of the float D. In Fig. 4 the brake is open. To close it, the operator forces the lever 41 from 53 to 54, the extremities of the springs 49, 50, coming in contact with the floats, and the friction will gradually stop all movement.

The floats A, B, C and D, are attached to their levers as follows: the float A being attached to the levers J and L by the bolts 55 as shown in Fig. 1, while the float B is attached to the levers K and M so that the float B and its levers K and M can move freely between the levers J and L as in Fig. 1. The float C is attached to its levers N and P similar to float A and between levers N and P is the float D, which is attached to its levers O and Q similar to float B so that float D can move freely between the levers N and P. The floats are made sharp on top at 67 and 67' to reduce the friction of the water.

As sea waves vary in height, I have found it necessary to provide a device for registering constantly their height (see Fig. 7.) 59 is a float, 60 is the normal water level. The float can move upward and downward from 61 to 62, supposing this to be the maximum height of the waves where the motor is to be used. 63 is an indicating arrow attached to the staff 64 fastened to the float 59. 64 is a graduated plate starting at zero at the center and marked from 1 to 8 both upward and downward. For example: if the distance between the marks on the plate is 6 inches, and the arrow marks 2 above zero and 2 below, the distance covered will be 24 inches. Under such conditions, the vertically movable bars attached to the floats may remain centrally attached to the perforated plate upon the float, and in case of variation, the connection will be moved to the right or left, as required.

Having now fully described my invention, what I claim as new therein, and desire to secure by Letters Patent, is:

1. A wave motor in which is comprised a plurality of floats each attached to levers pivoted on opposite sides of the float, a vertical connection adjustably connected to each float adapted to move a shaft bearing a fly wheel, and a driving shaft to which the shafts of the first mentioned fly wheels are connected, substantially as shown and described.

2. In a device of the character herein specified, a float attached to levers pivoted on opposite sides of the float, and a perforated plate carried by the float, in combination with vertical adjustable power transmitting mechanism, substantially as shown and described.

3. In a device of the character herein specified, the combination with a float attached to levers pivoted on opposite sides of the float, of a chain and an adjustable, vertically movable motion transmitting device adapted and arranged to continuously drive the said chain in one direction, substantially as shown and described.

4. In a device of the character herein specified, the combination with a vertically movable float of adjustable motion transmitting mechanism provided with a plurality of fixed teeth adapted and arranged to engage a power transmitting chain, substantially as shown and described.

5. In a device of the character herein specified, the combination with a float of an adjustable motion transmitting device, comprising a pair of weighted pivoted bars, each provided with fixed teeth arranged as shown and an endless chain with which said teeth are arranged to engage, substantially as shown and described.

6. In a device of the character herein specified, the combination with the floats of brake mechanism arranged to engage therewith, substantially as shown and described.

7. In a device of the character herein specified, the combination with a plurality of floats having an adjustable, vertically movable motion transmitting device attached to each float, of a wave bed located beneath the floats having a series of swells and indentations, substantially as shown and described.

8. In a device of the character herein described the combination of a fly wheel having a pocket and a weight substantially as and for the purposes described.

VINCENT RASCHELLA.

Witnesses:
 LOUIS C. HAUENSTEIN,
 ALOIS M. LUTZ.

Copies of this patent may be obtained for five cents each, by addressing the "Commissioner of Patents, Washington, D. C."